United States Patent [19]
Krapcho

[11] 3,852,347
[45] Dec. 3, 1974

[54] SUBSTITUTED CYCLOALKYL UREAS
[75] Inventor: John Krapcho, Somerset, N.J.
[73] Assignee: E. R. Squibb & Sons, Inc., Princeton, N.J.
[22] Filed: Sept. 15, 1972
[21] Appl. No.: 289,394

[52] U.S. Cl.... 260/553 A, 260/247.2 A, 260/268 R, 260/293.65, 260/293.76, 260/293.77, 260/326.43, 260/247.5 R, 260/293.78, 260/326.85, 260/553 R, 424/248, 424/251, 424/267, 424/274, 424/322
[51] Int. Cl............................................ C07c 127/18
[58] Field of Search...... 260/553 A, 293.65, 293.76, 260/293.77, 553 R, 326.43

[56] References Cited
UNITED STATES PATENTS
2,673,878   3/1954   Cusic .............................. 260/553 A
FOREIGN PATENTS OR APPLICATIONS
1,038,031   9/1958   Germany ....................... 260/553 A Primary Examiner—Bernard Helfin
Assistant Examiner—Michael W. Glynn
Attorney, Agent, or Firm—Lawrence S. Levinson; Merle J. Smith; Donald J. Perrella

[57] ABSTRACT
Compounds of the formula

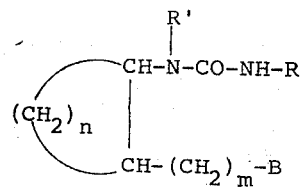

wherein
$n$ is 3, 4, 5 or 6;
$R'$ is hydrogen or alkyl of from 1 to 6 carbon atoms;

$R$ is hydrogen, alkyl of from 1 to 6 carbon atoms, cycloalkyl of from 5 to 8 carbon atoms, or a radical of the formula

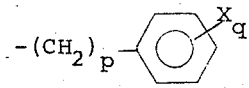

wherein $p$ is 0, 1, 2 or 3; X is halogen, $-CF_3$, $-OR$ wherein R is as defined previously, nitro, amino, or alkyl of from 1 to 6 carbon atoms; and $q$ is 0 or 1;
$m$ is 1, 2 or 3; and
B is pyrrolidino, piperidino, morpholino, piperazino,

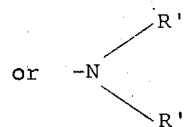

wherein $R'$ is as defined previously. The compounds of the invention are useful as antiinflammatory agents.

2 Claims, No Drawings

SUBSTITUTED CYCLOALKYL UREAS

OBJECTS OF THE INVENTION

It is an object of the present invention to provide new compounds which have utility as antiinflammatory agents. Another object is to provide a method for treating disorders caused by inflammation. A further object is to provide a method for preparing the novel compounds of the present invention. These and other objects of the present invention will be apparent from the following description.

DETAILED DESCRIPTION

The compounds of the present invention may be prepared by the following sequence of operations:

1. converting the alkylated cycloalkanone group to an oxime,
2. reducing the oxime to an amino group,
3. forming a mono-substituted amine,
4. interacting the amine or mono-substituted amine with an isocyanate.

In the following equations which illustrate the foregoing process, the letters $n$, $m$, and B are as defined above, $R^2$ is alkyl of 1–6 carbons, and $R^3$ is the same as R but may not be hydrogen.

The starting materials of Formula II wherein $m$ is 1 may be prepared by reacting a cycloalkanone with a compound of the formula HB wherein B is as defined previously and formaldehyde. Starting materials wherein $m$ is 2 or 3 may be prepared according to the procedure described by Rhoades, J. A. C. S., 74, 2891 (1952).

The alkylated cycloalkanone of Formula II is converted to an oxime by reaction with hydroxylamine. This reaction takes place by treating an aqueous solution of the alkylated cycloalkanone II with base followed by adding $NH_2OH \cdot HCl$. After mixing for a period of from about 1 to about 8 hours, the solution is saturated with base and the oxime III extracted with a water-immiscible solvent and dried.

The resulting oxime of Formula III may then be reduced to the amino compound by catalytic hydrogenation with Raney nickel at temperatures of from about room temperature to about 100° at a pressure of about 3 atmospheres of $H_2$. Higher pressures may be employed if a faster reaction is desired.

The resulting amino compound of Formula IV may then be converted to a mono-alkylated amino compound of Formula V by reaction with an acyl halide of the formula $R^2COX$ wherein $R^2$ is alkyl of from 2 to 6

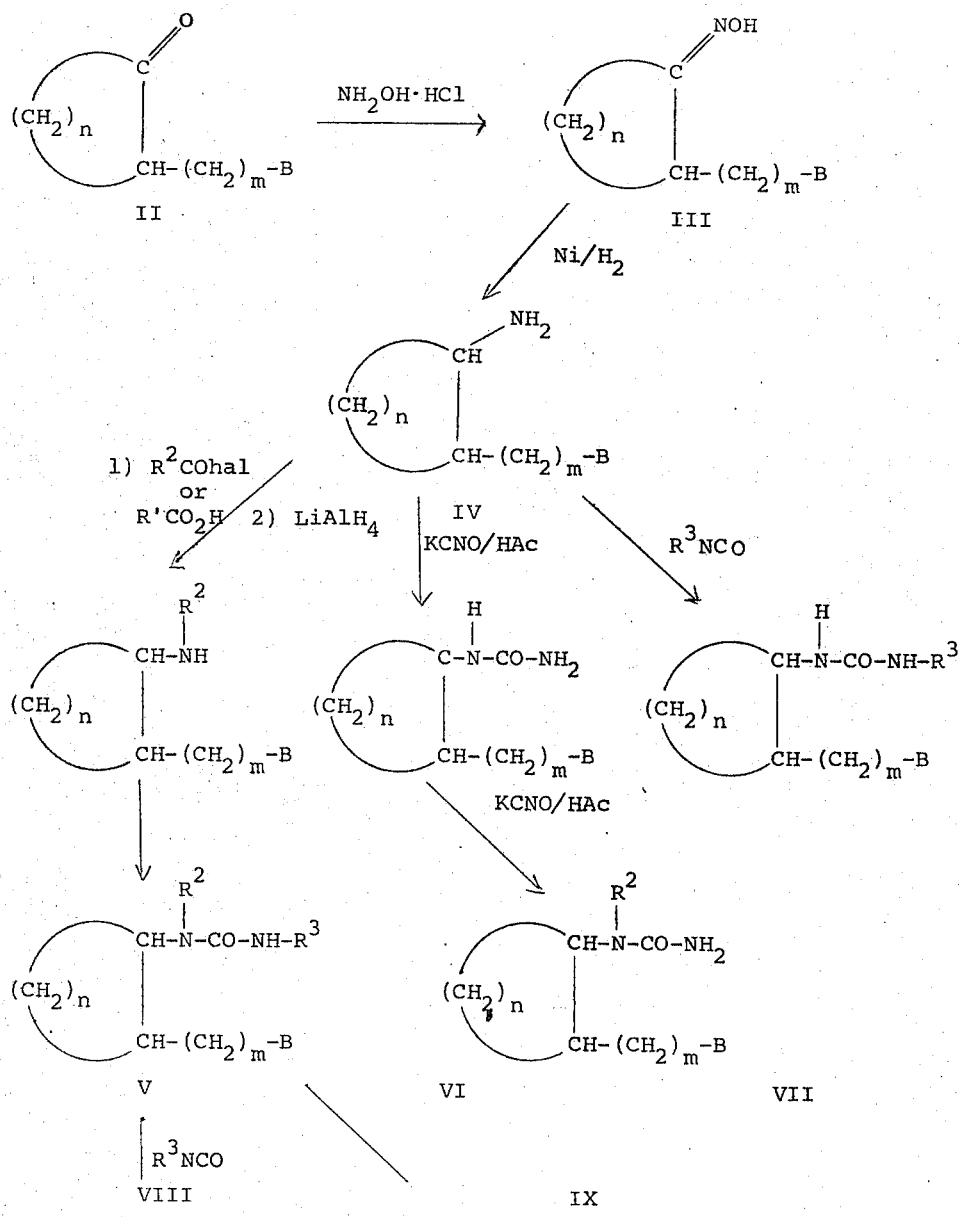

carbon atoms, or with an acid of the formula R'CO$_2$H followed by treatment with LiAlH$_4$. The reaction is carried out by treating a solution of IV in an inert solvent, e.g., benzene, toluene, chloroform, dioxane, etc., with the acyl halide at room temperature followed by refluxing to complete the reaction. The mixture is then cooled and base added to liberate the compound of Formula V from its hydrohalide salt. The liberated base is then dried, e.g., over MgSO$_4$, and the solvent evaporated to yield V. Compounds of Formula V wherein R$^2$ is methyl are obtained by treating a compound of Formula IV with formic acid and then heating at a temperature of about 100°. Excess acid is removed and a solution of the formyl derivative in tetrahydrofuran is treated with LiAlH$_4$.

A compound of Formula VI may be prepared by reacting the amino compound of Formula IV with KCNO in the presence of acetic acid.

A compound of Formula VI may be prepared by reacting a solution of a compound of Formula IV in acetic acid with an aqueous solution of KCNO. The reaction takes place at temperatures of from about room temperature to about 50° in a period of from about 1 to about 12 hours.

In similar fashion a compound of Formula IX may be prepared by reacting a solution of a compound of Formula V in acetic acid with an aqueous solution of KCNO. The reaction takes place at temperatures of from about room temperature to about 50° in a period of from about 1 to about 12 hours.

A compound of Formula VII may be prepared by reacting the amino compound of Formula IV with an isocyanate of the formula R$^3$NCO wherein R$^3$ is the same as R except R$^3$ is not H.

A compound of Formula VIII may be prepared by reacting a solution of a compound of Formula V in an inert solvent, e.g., benzene, toluene, chloroform, dioxane, etc., with an isocyanate of the formula R$^3$NCO. The reaction takes place at room temperature followed by refluxing to complete the reaction. The product either crystallizes from the solution or is obtained as the free base upon evaporation of the solvent. In similar fashion a compound of Formula VII is obtained by reacting a solution of a compound of Formula IV in an inert solvent, e.g., benzene, toluene, chloroform, dioxane, etc., with an isocyanate of the formula R$^3$NCO. The reaction takes place at room temperature followed by refluxing to complete the reaction. The product either crystallizes from the solution or is obtained as the free base upon evaporation of the solvent.

The compounds of this invention are useful as antiinflammatory agents and are effective in the prevention and inhibition of granuloma tissue formation in warm blooded animals, for example in a manner similar to phenylbutazone or indomethacin. They may be used to decrease joint swelling tenderness, pain and stiffness in mammalian species, e.g., in conditions such as rheumatoid arthritis. The compounds of this invention or a physiologically acceptable acid-addition salt thereof may be compounded according to accepted pharmaceutical practice for administration orally or by injection. Suitable oral dosage forms are tablets, capsules, elixirs, or powders, while solutions or suspensions are suitable for injection. The quantity administered may be from about 25 mg to about 2 gm per day in two to four divided doses, and preferably from about 100 mg to about 1 gm per day.

The compounds of the present invention in the described dosages may be administered orally; however, other routes such as intraperitoneally, subcutaneously, intramuscularly or intravenously may be employed.

The active compounds of the present invention are orally administered, for example, with an inert diluent or with an assimilable edible carrier, or they may be enclosed in hard or soft gelatin capsules, or they may be compressed into tablets, or they may be incorporated directly with the food of the diet. For oral therapeutic administration, the active compounds of this invention may be incorporated with excipients and used in the form of tablets, troches, capsules, elixirs, suspensions, syrups, wafers, chewing gum, and the like. Such compositions and preparations should contain at least 0.1 percent of active compound. The percentage in the compositions and preparations may, of course, be varied and may conveniently be between about 5 percent to about 75 percent or more of the weight of the unit. The amount of active compound in such therapeutically useful compositions or preparations is such that a suitable dosage will be obtained. Preferred compositions or preparations according to the present invention are prepared so that an oral dosage unit form contains between about 10 and 200 milligrams of active compound.

The tablets, troches, pills, capsules and the like may also contain the following: a binder such as gum tragacanth, acacia, corn starch or gelatin; an excipient such as dicalcium phosphate; a disintegrating agent such as corn starch, potato starch, alginic acid and the like; a lubricant such as magnesium stearate; and a sweetening agent such as sucrose, lactose or saccharin may be added or a flavoring agent such as peppermint, oil of wintergreen, or cherry flavoring. When the dosage unit form is a capsule, it may contain in addition to materials of the above type a liquid carrier such as a fatty oil. Various other materials may be present as coatings or to otherwise modify the physical form of the dosage unit, for instance, tablets, pills or capsules may be coated with shellac, sugar or both. A syrup or elixir may contain the active compounds, sucrose as a sweetening agent, methyl and propyl parabens as preservatives, a dye and a flavoring such as cherry or orange flavor. Of course, any material used in preparing any dosage unit form should be pharmaceutically pure and substantially nontoxic in the amounts employed.

As to the salts, those coming within the purview of this invention include the acid-addition salts, particularly the pharmaceutically acceptable acid-addition salts, N-oxides and pharmaceutically acceptable acid-addition salts of N-oxides, and pharmaceutically acceptable quaternary ammonium salts. Acids useful for preparing these acid-addition salts include, inter alia, inorganic acids, such as the hydrohalic acids (e.g., hydrochloric and hydrobromic acid), sulfuric acid, nitric acid, and phosphoric acid, and organic acids such as maleic, fumaric, tartaric, citric, acetic, benzoic, 2-acetoxybenzoic, salicylic, succinic acid, theophylline, 8-chlorotheophylline, p-aminobenzoic, p-acetamidobenzoic, nicotinic, methanesulfonic or cyclohexanesulfamic.

The following examples illustrate the present invention without, however, limiting the same thereto. All temperatures are expressed in degrees centigrade.

Example 1

1-(p-Chlorophenyl)-3-[2-[(diethylamino)methyl]cyclohexyl]urea, hydrochloride (Isomer A)

1. 2-(Diethylaminomethyl)cyclohexanone

To a 3 liter flask is added 146 g (2.0 moles) of diethylamine and 600 g (6.0 moles) of cyclohexanone. This solution is stirred and treated portionwise with 170 ml (2.0 moles) of concentrated hydrochloric acid while maintaining the temperature below 40°. This mixture is then cooled to 25°, treated with 150 ml (162 g – 2.0 mole) of 37 percent formaldehyde solution, and heated slowly (30 minutes) to 80°. The temperature is maintained at 75°–80° for 30 minutes, cooled to room temperature and treated with 500 ml of cold water and 500 ml of ether. The mixture is shaken and the layers separated. The aqueous phase is extracted twice with 500 ml of ether, cooled, and treated slowly with 400 g of $K_2CO_3$. The liberated base is extracted with 500 ml of ether (three times). The organic phases are combined, dried ($MgSO_4$) and the solvent removed on a rotary evaporator to give 346 g (94%) of an oily residue.

2. Oxime of 2-(diethylaminomethyl)cyclohexanone

A solution of 200 g of the product of part 1 in 750 ml of water is gradually treated with 148 g of $K_2CO_3$. To this is added 54.8 g of $NH_2OH.HCl$. After mixing for 4 hours, the solution is saturated with $K_2CO_3$ and the product extracted with 2 × 250 ml ether. The ether solution is dried over $MgSO_4$ and concentrated to an oily residue weighing 119 g (94%).

3. 2-(Diethylaminomethyl)cyclohexylamine

A solution of 30 g of oxime in 150 ml of ethanol is treated with Raney nickel (5g) and the mixture hydrogenated at 55 lbs pressure with heating at 50°–55° for 1 hour. The catalyst is then filtered off and the solvent removed at reduced pressure. The foregoing procedure is repeated three times to give a total yield of 73 g (66%) of title compound as a colorless liquid, b.p. 87°–88°/2 mm. The compound is then purified as the dihydrochloride salt which is prepared by dissolving the title compound (70 g) in 130 ml ethanol and treated with 134 ml of 5.7 N alcoholic HCl while maintaining the temperature at 30°. The precipitated product gradually dissolves. The solution is seeded and cooled to give 66 g (43%) of the colorless di-HCl salt, m.p. 235°–239°. Recrystallization from 260 ml of ethanol yields 45.5 g (30%) of the product, m.p. 242°–244°.

The di-HCl salt is dissolved in 200 ml of water. The base is liberated by saturation of the solution with $K_2CO_3$ and extraction into 5 × 200 ml of ether. The ether solution is dried and concentrated to a residue.

4. 1-(p-chlorophenyl)-3-[2-[(diethylamino)methyl]cyclohexyl]urea, hydrochloride

A solution of 10 g (0.054 mole) of distilled 2-(diethylaminomethyl)cyclohexylamine in 150 ml of ether is treated dropwise at 20° with a solution of 9.0 g (0.058 mole) of p-chlorophenyl isocyanate in 50 ml of ether. After stirring for one-half hour, the mixture is refluxed for 15 minutes, cooled and filtered to give 15.7 g of colorless solid, m.p. 118°–130° (s. 114°).

A warm solution of the above material in 20 ml of $CHCl_3$ is stirred and cooled to 25° to give 8.9 g of a colorless solid, m.p. 155°–157°. Crystallization from 75 ml of acetone gives 7.5 ml of colorless needle-like crystals, m.p. 157°–159°.

A solution of the above base in 30 ml of $CHCl_3$ is treated with one equivalent of alcoholic HCl. After removal of the solvent, the residue is dissolved in 100 ml of $CH_3CN$ and concentrated to a volume of 25 ml. Dilution with 100 ml of ether slowly crystallizes 7.0 g of colorless product, m.p. 171°–172°. Recrystallization from 14 ml of $CH_3CN$ gives 6.4 g (32%) of colorless crystals, m.p. 171°–172°.

5. 1-(p-Chlorophenyl)-3-[2-[(diethylamino)methyl]cyclohexyl]urea, hydrochloride (Isomer B)

The $CHCl_3$ filtrate (20 ml) from the foregoing crystallization is diluted with 25 ml of ether to give 4.5 g of a colorless solid, m.p. 127°–133°. Crystallization from 30 ml of acetone gives 3.7 g of a mixture, m.p. 128°–134°. Recrystallization from 10 ml of ethanol gives 2.6 g of base, m.p. 135°–137°.

A solution of the above material in 20 ml of $CHCl_3$ is treated with 1 eq. of alcoholic HCl. After removal of the solvent, the residue is triturated with 25 ml of acetone to precipitate 2.4 g of colorless solid, m.p. 151°–155°. Crystallization from 5 ml of $CH_3CN$ (2×) gives 1.8 g (9.0%) of colorless crystals, m.p. 155°–156°.

EXAMPLE 2

1-(p-Chlorophenyl)-3-[2-[(diethylamino)methyl]cyclohexyl]-3-methylurea, hydrochloride 1. N-Formyl-2-(diethylaminomethyl)cyclohexylamine To 125 ml of 98–100 percent formic acid there is gradually added 36.8 g (0.2 mole) of 2-(diethylaminomethyl)cyclohexylamine. An ice bath is employed to keep the temperature below 35°. When the addition is complete, the solution is refluxed for 20 hours.

The excess acid is removed by distillation under reduced pressure. The residue is gradually diluted with 150 ml water containing 28 g $K_2CO_3$. An additional 80 g of $K_2CO_3$ is added to the solution and the amide extracted with 200 ml ether (2times). The solvent is dried over $MgSO_4$ 2 concentrated to a residue. Fractionation gives 35.2 g (83%) of colorless material, b.p. 135°–6° (2 mm).

2. 2-(Diethylaminomethyl)cyclohexylmethylamine

A solution of 30 g (0.141 mole) of the above formyl compound in 50 ml THF is added dropwise to a cooled suspension of 10 g (0.264 mole) of $LiAlH_4$ in 250 ml THF. After addition is completed, the mixture is refluxed for 4 hours, cooled and treated dropwise with 10 ml of water. A solution of 4 g of NaOH in 20 ml water is added dropwise, followed by the addition of 700 ml of ether. After 2 hours of agitation, the mixture is treated with Darco (3 g), $MgSO_4$, and filtered through a sintered glass funnel. The solids are washed well with ether. After evaporation of the solvent, the residue is fractionated to give 20.4 g (73%) of colorless liquid; b.p. 70°–72° (2 mm).

3. 1-(p-Clorophenyl)-3-[2-[(diethylamino)methyl]cyclohexyl]-3-methylurea, hydrochloride Interaction of 10.5 g of the material from part 2 with 90 g of p-chlorophenylisocyanate in the same manner as described in Example 1, part 4, yields the title product.

EXAMPLES 3–5

Following the procedure of Example 1 substituting for cyclohexanone the cycloalkanone indicated in Column I, there is obtained the corresponding compound of Formula I wherein $n$ has the value indicated in Column II, R′ is H, R is

Cl, m is 1, and B is $-N(C_2H_5)_2$:

| Example | I | II |
|---|---|---|
| 3 | Cyclopentanone | 3 |
| 4 | Cycloheptanone | 5 |
| 5 | Cyclooctanone | 6 |

EXAMPLES 6–13

Following the procedure of Example 1 but employing as alkylated cycloalkanone the compounds listed in Column I, there is obtained the corresponding compound of Formula I wherein $n$ has the value indicated in Column II, $m$ has the value indicated in Column III, B is as indicated in Column IV, R' is H and R is

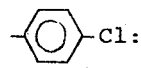

EXAMPLES 14–30

The procedure of Example 1 is repeated except substituting for p-chlorophenyl isocyanate in part 4 the isocyanate indicated in Column I below. In the final product of Formula I, $n$ is 4, $m$ is 1, B is $-N(C_2H_5)_2$, R' is hydrogen and R is the radical indicated in Column II:

| Example | I | II | III | IV |
|---|---|---|---|---|
| 6 | 2-(dimethylaminoethyl)-cyclohexanone | 4 | 2 | $-N(CH_3)_2$ |
| 7 | 2-(diethylaminopropyl)-cyclopentanone | 3 | 3 | $-N(C_2H_5)_2$ |
| 8 | 2-(pyrollidinoethyl)-cyclohexanone | 4 | 2 | -N⟨pyrrolidine⟩ |
| 9 | 2-(diethylaminoethyl)-cycloheptanone | 5 | 2 | $-N(C_2H_5)_2$ |
| 10 | 2-(piperidinomethyl)-cyclopentanone | 3 | 1 | -N⟨piperidine⟩ |
| 11 | 2-(morpholinopropyl)-cyclooctanone | 6 | 3 | -N⟨morpholine⟩ |
| 12 | 2-(4-methylpiperazinomethyl)cyclohexanone | 4 | 1 | -N⟨N-CH_3 piperazine⟩ |
| 13 | 2-(dihexylaminomethyl)-cyclopentanone | 3 | 1 | $-N(C_6H_{13})_2$ |

| Example | I | II |
|---|---|---|
| 14 | methyl isocyanate | $-CH_3$ |
| 15 | ethyl isocyanate | $-C_2H_5$ |
| 16 | hexyl isocyanate | $-C_6H_{13}$ |
| 17 | butyl isocyanate | $-C_4H_9$ |
| 18 | cyclopentyl isocyanate | -⟨cyclopentyl⟩ |
| 19 | cyclohexyl isocyanate | -⟨cyclohexyl⟩ |
| 20 | cycloheptyl isocyanate | -⟨cycloheptyl⟩ |
| 21 | cyclooctyl isocyanate | -⟨cyclooctyl⟩ |

| Example | I | II |
|---|---|---|
| 22 | phenethyl isocyanate | 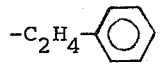 |
| 23 | phenylpropyl isocyanate | 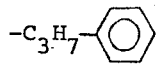 |
| 24 | p-trifluoromethylphenyl isocyanate | 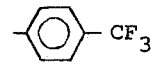 |
| 25 | o-methoxyphenyl isocyanate |  |
| 26 | m-nitrophenyl isocyanate | 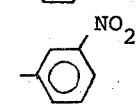 |
| 27 | p-nitrophenyl isocyanate | 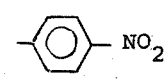 |
| 28 | o-tolyl isocyanate |  |
| 29 | m-benzyloxyphenyl isocyanate | 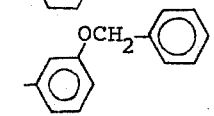 |
| 30 | cyclohexyloxyphenyl isocyanate | 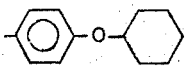 |

EXAMPLE 31

3-[2-[(Diethylamino)methyl]cyclohexyl]urea

A solution of 10 g (0.054 mole) of distilled 2-(diethylaminomethyl)cyclohexylamine is dissolved in 20 ml of glacial acetic acid, diluted with 300 ml of water and treated at 30° with a solution of 4.77 g (0.054 mole) of 92 percent potassium cyanate in 30 ml of water. After standing overnight at room temperature, the solution is basified with potassium carbonate, and the liberated oil is extracted with ether (3 × 200 ml), dried (MgSO₄), and Darco-treated. A crystalline solid is separated from ether. The ether is decanted and the solid is taken up in 500 ml of chloroform. Evaporation of the combined ether and chloroform liquors gives the title compound.

EXAMPLE 32

3-[2-[Diethylamino)methyl]cyclohexyl -3-methyl]urea

A solution of 10.5 g of 2-(diethylaminomethyl)-cyclohexylmethylamine is dissolved in 20 ml of glacial acetic acid, diluted with 300 ml of water, and treated at 30° with a solution of 4.7 g of 92 percent potassium cyanate in 30 ml of water. After standing overnight at room temperature, the solution is basified with potassium carbonate, and the liberated oil is extracted with ether (3 × 200 ml), dried (MgSO₄), and Darco-treated. A crystalline solid is separated from ether. The ether is decanted and the solid is taken up in 500 ml of chloroform. Evaporation of the combined ether and chloroform liquors gives the title compound.

EXAMPLE 33

1-(p-Aminophenyl)-3-[2-[(diethylamino)methyl]cyclohexyl]urea

Catalytic hydrogenation (Pd/C) of the final product of Example 27 in ethanol at 3 atmospheres of hydrogen and room temperature, and then removing the catalyst by filtration and the solvent by evaporation yields the title compound.

EXAMPLE 34

1-(3-Hydroxyphenyl)-3-[2-[(diethylamino)methyl]cyclohexyl]urea

Catalytic debenzylation of the final product of Example 29 using the conditions employed in Example 33, yields the title compound.

EXAMPLE 35

1-(p-Chlorophenyl)-3-[2-[(diethylamino)methyl]cyclohexyl]-3-propylurea, hydrochloride Following the procedure of Example 1 but employing propionyl chloride in place of formic acid and utilizing benzene as a solvent, the title compound is obtained.

EXAMPLE 36

Preparation of Capsule Formulation

| Ingredient | Milligrams per Capsule |
|---|---|
| Final product of Ex. 1, isomer A | 100 |
| Starch | 180 |
| Magnesium stearate | 5 |

The active ingredient, starch and magnesium stearate are blended together. The mixture is used to fill hard shell capsules of a suitable size at a fill weight of 285 milligrams per capsule.

EXAMPLE 37

Preparation of Tablet Formulation

| Ingredient | Milligrams per Tablet |
| --- | --- |
| Final product of Example 2 | 100 |
| Lactose | 200 |
| Corn starch (for mix) | 50 |
| Corn starch (for paste) | 50 |
| Magnesium stearate | 6 |

The active ingredient, lactose and corn starch (for mix) are blended together. The corn starch (for paste) is suspended in water at a ratio of 10 grams of corn starch per 80 milliliters of water and heated with stirring to form a paste. This paste is then used to granulate the mixed powders. The wet granules are passed through a No. 8 screen and dried at 120°F. The dry granules are passed through a No. 16 screen. The mixture is lubricated with magnesium stearate and compressed into tablets in a suitable tableting machine. Each tablet contains 100 milligrams of active ingredient.

EXAMPLE 38

Preparation of Oral Syrup Formulation

| Ingredient | | Amount |
| --- | --- | --- |
| Final product of Example 1, isomer B | | 5000 mg. |
| Sorbitol solution (70% N.F.) | | 40 ml. |
| Sodium benzoate | | 150 mg. |
| Sucaryl | | 90 mg. |
| Saccharin | | 10 mg. |
| Red dye (F.D. & C. No. 2) | | 10 mg. |
| Cherry flavor | | 50 mg. |
| Distilled water | qs to | 100 ml. |

The sorbitol solution is added to 40 milliliters of distilled water and the active ingredient is suspended therein. The sucaryl, saccharin, sodium benzoate, flavor and dye are added and dissolved in the above solution. The volume is adjusted to 100 milliliters with distilled water.

Other ingredients may replace those listed in the above formulation. For example, a suspending agent such as bentonite magma, tragacanth, carboxymethylcellulose, or methylcellulose may be used. Phosphates, citrates or tartrates may be added as buffers. Preservatives may include the parabens, sorbic acid and the like and other flavors and dyes may be used in place of those listed above.

EXAMPLE 39

A solution of carageenin is injected into the plantar surface of the hind paws of three groups of seven rats 2 hours after oral administration of 150 mg, 75 mg and 37.5 mg/kg of the final product of Example 1 (Isomer A) to the respective groups. Three hours after the injection (5 hours after the oral administration) the edema in the treated paw is measured. Compared to a group of seven control rats, swelling is reduced by 58 percent, 52 percent and 31 percent, for the respective groups.

What is claimed is:

1. A compound of the formula

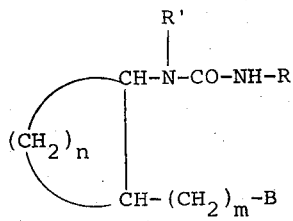

or salts thereof with pharmaceutically acceptable acids wherein $n$ is 3, 4, 5 or 6;

R' is H or alkyl of from 1 to 6 carbon atoms;

R is H, alkyl of from 1 to 6 carbon atoms, or a radical of the formula

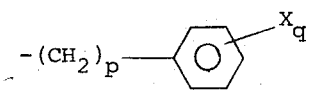

wherein $p$ is 0, 1, 2 or 3;

X is F, Cl, Br or I, $CF_3$, nitro, amino, alkyl of from 1 to 6 carbon atoms or —OR wherein R is H, alkyl of from 1 to 6 carbon atoms, cycloalkyl of from 5 to 8 carbon atoms, or benzyl; and $q$ is 0 or 1;

$m$ is 1, 2, or 3; and

B is pyrrolidino, piperidino, or $-N\begin{matrix}R'\\R'\end{matrix}$ wherein R' is as defined previously.

2. A compound of claim 1 having the name 1-(p-chlorophenyl)-3-[2-[diethylamino)methyl]cyclohexyl]urea.

* * * * *

UNITED STATES PATENT OFFICE
CERTIFICATE OF CORRECTION

PATENT NO. : 3,852,347
DATED : December 3, 1974
INVENTOR(S) : John Krapcho

It is certified that error appears in the above-identified patent and that said Letters Patent are hereby corrected as shown below:

On the abstract page, column 2, first formula, insert next to the formula "I".
Please change the last 2 lines of the formulae on page 1 to read as follows:

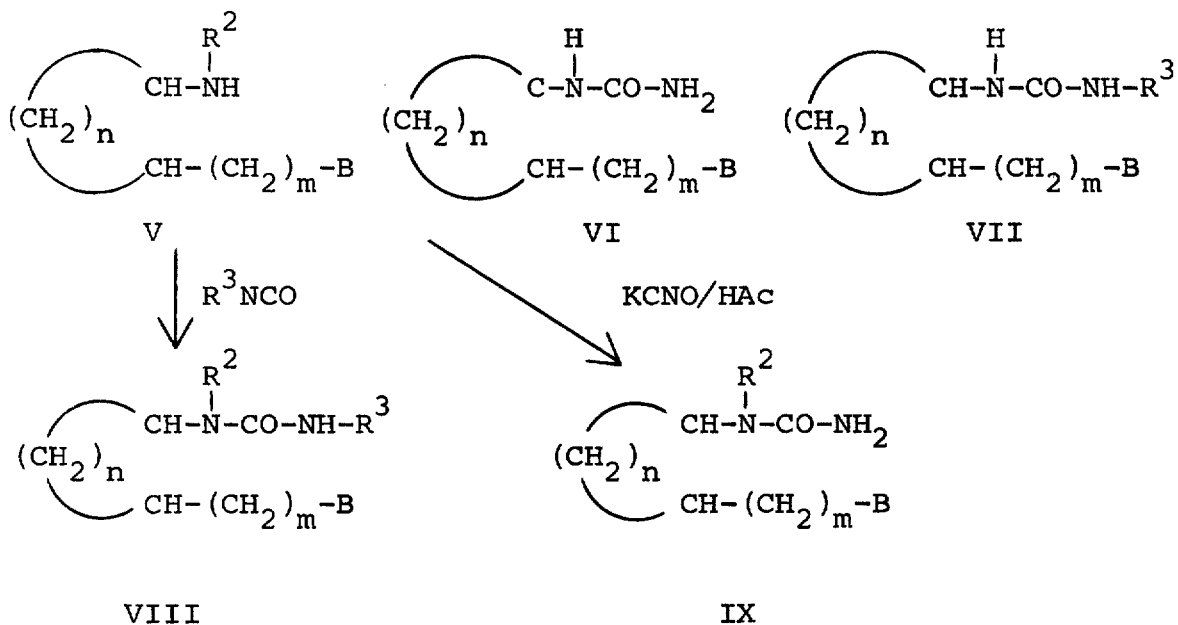

UNITED STATES PATENT OFFICE
CERTIFICATE OF CORRECTION

Patent No. 3,852,347                    Dated December 3, 1974

Inventor(s) John Krapcho

It is certified that error appears in the above-identified patent and that said Letters Patent are hereby corrected as shown below:

Column 6, line 27, "2" should read --and--.
Column 6, line 54, after "Example 1" insert --but--.
Column 12, line 54, before "diethylamino" insert --(--.

Signed and sealed this 1st day of July 1975.

(SEAL)
Attest:

RUTH C. MASON
Attesting Officer

C. MARSHALL DANN
Commissioner of Patents
and Trademarks